United States Patent
Rahlves et al.

(10) Patent No.: US 11,960,872 B2
(45) Date of Patent: Apr. 16, 2024

(54) SYSTEM AND METHOD FOR TRANSFERRING AN OPERATING SOFTWARE UPDATE TO A SAFETY-ORIENTED DEVICE

(71) Applicant: Phoenix Contact GmbH & Co. KG, Blomberg (DE)

(72) Inventors: Lutz Rahlves, Tündern (DE); Dominik Kerscher, Bad Salzuflen (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 291 days.

(21) Appl. No.: 17/431,118

(22) PCT Filed: Feb. 18, 2020

(86) PCT No.: PCT/EP2020/054175
§ 371 (c)(1),
(2) Date: Aug. 13, 2021

(87) PCT Pub. No.: WO2020/169565
PCT Pub. Date: Aug. 27, 2020

(65) Prior Publication Data
US 2022/0137951 A1     May 5, 2022

(30) Foreign Application Priority Data

Feb. 18, 2019    (BE) .................................. 2019/5103

(51) Int. Cl.
*G06F 9/445*     (2018.01)
*G06F 8/65*     (2018.01)
*G06F 8/71*     (2018.01)

(52) U.S. Cl.
CPC .................. *G06F 8/65* (2013.01); *G06F 8/71* (2013.01)

(58) Field of Classification Search
CPC ...... G06F 8/65; G06F 2115/10; G06F 21/572; G06F 11/1433; G06F 8/61; G06F 9/5027;
(Continued)

(56) References Cited

U.S. PATENT DOCUMENTS 10,621,796 B2 *   4/2020   Gintz ..................... G07C 5/008
2011/0256024 A1   10/2011   Cole et al.
(Continued)

FOREIGN PATENT DOCUMENTS

EP          1532494 B1    1/2009
WO    2017/013134 A1    1/2017

OTHER PUBLICATIONS

English Translation of the International Preliminary Report on Patentability, Aug. 10, 2021, 11 pp.
(Continued)

*Primary Examiner* — Chuck O Kendall
(74) *Attorney, Agent, or Firm* — Kaplan Breyer Schwarz, LLP

(57) ABSTRACT

A system including a safety-oriented device and an electronic storage device which is separate therefrom and in which exactly one piece of data content for the device is stored. The exactly one piece of data content is either an operating software update or an address. The electronic storage device has a first connection unit for mechanical and electrical coupling to the device, the first connection unit comprising a first mechanical coding means. The device has a storage unit in which an operating system is stored, a microcontroller and a second connection unit for mechanical and electrical coupling to the electronic storage device, the second connection unit having a second mechanical coding means. The microcontroller is designed to recognize whether the electronic storage device is connected via its first connection unit to the second connection unit of the
(Continued)

device, and in this case is also designed to download the exactly one piece of data content stored in the electronic storage device to the storage unit of the device.

15 Claims, 4 Drawing Sheets

(58) Field of Classification Search
CPC ............. G06F 12/0284; G06F 12/0802; G06F 2212/2022; G06F 2212/2146; G06F 2212/222; G06F 2212/656; G06F 3/0664
USPC .................................................. 717/168–178
See application file for complete search history.

(56) References Cited

U.S. PATENT DOCUMENTS

| | | | |
|---|---|---|---|
| 2011/0293095 A1* | 12/2011 | Ben Ayed | H04W 12/50 455/26.1 |
| 2013/0125107 A1* | 5/2013 | Bandakka | G06F 11/1433 717/171 |
| 2014/0068596 A1 | 3/2014 | Mota | |
| 2015/0050678 A1 | 2/2015 | Elder et al. | |

OTHER PUBLICATIONS

"Universal Serial Bus". In: Wikipedia, the free encyclopaedia, Feb. 17, 2019, 45 pp. w/ English version, 20:14 UTC, https://de.wikipedia.org/index.php?Title=Universal_Serial_Bus&oldid=185783223, Oct. 29, 2020.
International Search Report issued in counterpart PCT application No. PCT/EP2020/054175, Apr. 17, 2020, 5 pp.
Written Opinion issued in counterpart PCT application No. PCT/EP2020/054175, Apr. 17, 2020, 11 pp.
Search Report issued in counterpart German patent application No. 102019103985.1, Nov. 2, 2020, 12 pp. w/ translation.
Search Report issued in counterpart Belgian patent application No. BE 201805103, Nov. 13, 2019, 21 pp. w/ translation.
Patrick Gehlen, "Functional safety of machines and plants", Publisher: Siemens Aktiengesellschaft, dated 2010, ISBN 978-3-89578-366-1, pp. 120, 387, 408-410, 2nd revised edition.

* cited by examiner

SYSTEM AND METHOD FOR TRANSFERRING AN OPERATING SOFTWARE UPDATE TO A SAFETY-ORIENTED DEVICE

FIELD

The present invention relates to a system comprising a safety-oriented device, in particular a safety-oriented input/output module or a safety-oriented control unit, and to an electronic storage device which is separate therefrom and in which exactly one piece of data content for the device is stored, as well as to a method for transmitting exactly one piece of data content from an electronic storage device to a safety-oriented device within this system.

BACKGROUND

In order to reduce the risk to people or the environment in automated processes, machines and installations, safety functions must be implemented, such as switching off a machine after pressing an emergency stop button or transferring the installation to a safe state after a fault has been detected. Fail-safe automation systems are increasingly being used within the automated processes, machines and installations. In general, these fail-safe automation systems implement the actual safety function on the one hand, such as emergency stop, two-hand switching, operating mode selector switch, or the like, and on the other hand also error-detecting and error-controlling measures according, for example, to standards such as IEC 61508, ISO 13849 and other specified mechanisms, which correspond to the current prior art. If suitable measures ensure that an electrical, electronic and/or programmable electronic system, but also a single subsystem module or even a single hardware and/or software component, effectively fulfills a certain safety function, this system or the relevant subsystem module is safe or safety-oriented in the context of the following description and claims.

Safety-oriented devices, for example safety-oriented input/output modules and control units of a machine or installation, which comprise one or more integrated processors and also controllers, usually have an operating system. In order to keep this operating system up to date and, in particular, to eliminate errors in the operating system or to expand the functionality of the relevant safety-oriented device, it is necessary that an operating software update can be loaded onto the safety-oriented devices, which software update can be started from the respective safety-oriented device.

In some safety-oriented devices, for example in at least some modules with an IP rating IP20, the housing of the device must be opened and a new operating system installed in the device using special programming adapters. This can usually only be done directly by the manufacturer of the corresponding device and cannot be done on-site by the user of the input/output module. However, this poses a problem, particularly with input/output modules with an IP rating IP67, since these input/output modules cannot be opened. If an error in the operating system is detected or if the operating system needs to be updated, the only option is to replace these input/output modules with new input/output modules having an appropriately updated operating system and to scrap the input/output modules having an operating system that has not been updated.

In the field of functional safety technology, it must also be ensured that when the operating system is updated as part of an update, the version of the operating software update suitable for the corresponding device is also used. Under all circumstances, it must be avoided that an incorrect version of an operating software update or an operating software update that is not suitable for the corresponding device is installed on the corresponding device.

To ensure this, EP 1 532 494 B1 discloses, inter alia, a method for uploading a new operating system to a safety controller and a corresponding operating program in which a user and not the manufacturer independently uploads a new operating program, i.e. new firmware, to an existing safety controller. The control of the manufacturer over the safety device is maintained using special release information, since a new operating program is adopted only if this adoption has been released by the manufacturer in the release information. The method disclosed in EP 1 532 494 B1 can therefore be used to check whether the new operating program is the version suitable for the particular safety controller.

US 2015/0050678 A1 discloses an analysis measuring device which has a housing and an analysis module that can be electrically and mechanically connected to the housing. The analysis module has a storage means in which firmware updates for various measuring devices can be stored. The analysis module can be detachably connected to the housing of various analytical measuring devices in order to transfer the corresponding firmware update to the relevant housing.

SUMMARY

An object of the present invention is to provide a system comprising a safety-oriented device and an electronic storage device which is separate therefrom, as well as a method in which a piece of data content intended for the device, in particular an operating software update, in the version suitable for the device compared to the prior art can be transferred to the device in an alternative, simplified and improved manner.

As already mentioned at the outset, within the scope of the present invention, a safety-oriented or safety-related device is preferably a safety-oriented input/output module or a safety-oriented control unit that generates safety-related input signals and/or safety-related output signals or reacts to safety-related input signals in order to carry out safety-related control functions in the field of functional safety. Functional safety is described in detail, for example, in the technical book "Functional safety of machines and installations, implementation of the European machinery directive in practice, 2nd revised edition, 2010, Publicis Publishing Verlag" by Patrick Gehlen.

The object of the present invention is achieved by the features of claim 1 and formed and developed by the features of the dependent claims.

Accordingly, a system is provided which comprises a safety-oriented device and an electronic storage device which is separate therefrom and in which exactly one piece of data content for the device is stored. The exactly one piece of data content is either an operating software update or an address. The address is preferably a safety address. The electronic storage device comprises a first connection unit for mechanical and electrical coupling to the safety-oriented device, the first connection unit comprising a first mechanical coding means. The safety-oriented device comprises a storage unit in which an operating system is stored, a microcontroller and a second connection unit for mechanical and electrical coupling to the electronic storage device, the second connection unit comprising a second mechanical coding means. The first mechanical coding means and the second mechanical coding means are complementary to one another. The microcontroller of the device is designed to recognize whether the electronic storage device is connected via its first connection unit to the second connection unit of the device. If this is the case, the microcontroller is also designed to download the exactly one piece of data content stored in the electronic storage device from the electronic storage device to the storage unit of the device.

A safety-oriented device, which can in particular be a safety-oriented input/output module or a safety-oriented control unit, has, within the scope of the invention, in particular firmware or an operating system which occasionally requires an update. Furthermore, the safety-oriented device can also be, for example, a laser scanner, a frequency converter or a light grid.

In contrast to the prior art, an electronic storage unit is used to update an operating system, on which unit only exactly one piece of data content, which is either an operating software update or an address, is stored. If the exactly one piece of data content is an address, this address, which is used for communication between the safety-oriented device and, for example, other devices in a network infrastructure, is downloaded once into the storage unit of the device. In other words: The safety-oriented device can be specifically addressed by other devices using the address. If the exactly one piece of data content is an operating software update, this operating software update always corresponds to a specific version that is suitable and intended for the device. Since only one piece of data content and thus only a single operating software update is stored on the electronic storage device and mechanical coding means are used, it can, in contrast to an electronic storage device with, for example, a large number of versions of an operating software update stored thereon, be ruled out that inadvertently, for example by mistake, or intentionally, an incorrect version of the operating software update is transferred from the electronic storage device to the device.

In addition, in the system the first connection unit of the electronic storage device comprises a first mechanical coding means and the second connection unit of the safety-oriented device comprises a second mechanical coding means, the first and second mechanical coding means being complementary to one another. This has the advantage that an electrical coupling of the electronic storage device to the device, and consequently a transfer of the exactly one piece of data content from the electronic storage device to the device, takes place in particular only if the first and second mechanical coding means are correspondingly complementary to one another and consequently the electronic storage device is mechanically correctly coupled to the device via their respective mechanical coding means. Correct mechanical coupling means that the first mechanical coding means is mechanically coupled to the second mechanical coding means in the intended and envisaged manner and in particular that there is no forcible coupling of the first mechanical coding means to the second mechanical coding means contrary to the intended and envisaged manner. In other words: The mechanical coding means ensure that only the exact electronic storage unit belonging to or matching the particular device can be connected to this device.

Due to the exactly one piece of data content stored on the electronic storage device in combination with the mechanical coding according to the invention, it can be ensured in particular in a simple manner that the version of an operating software update that is both correct and suitable for the device can be transferred from the electronic storage device to the device. For example, the mechanical coding can ensure that the device can be identified, so that only one operating software update suitable for the operating system of the device is always stored on the electronic storage device. Because only a single piece of data content, and thus in particular only a single operating software update, is stored on the device, it can also be ensured that this operating software update is also available in the correct version for the device.

The microcontroller of the device is configured and designed to control and monitor the device. With regard to the transfer of data content from the electronic storage device to the device, the microcontroller only needs to be configured and designed such that it recognizes whether the electronic storage device is connected to the second connection unit of the device. If this is the case, the microcontroller must also be configured and designed to download the piece of data content stored in the electronic storage device to the storage unit of the device. For example, it is not necessary for the microcontroller to automatically check whether the data content and in particular the operating software update is the correct and suitable data content or the correct and suitable operating software update for the device. Since the microcontroller does not have to be designed in a complex manner with regard to the transfer of data content, in particular an operating software update, this lowers the costs for the microcontroller and thus for the device.

The process of downloading an operating software update runs automatically in the system according to the invention consisting of an electronic storage device and a device without, for example, release information as in EP 1 532 494 B1 or an activation code having to be checked or a user having to specify which operating software update should be downloaded. The system consisting of the electronic storage device and the device is therefore less complex in comparison to the prior art mentioned at the outset and therefore less expensive and also less prone to errors, which is an important aspect in particular in the field of functional safety.

The device preferably has a sensor which is designed to recognize whether the electronic storage device is correctly mechanically coupled to the device.

In an embodiment of the invention, the sensor of the device is a touch sensor which is designed to send an electrical signal to the microcontroller which signals that the electronic storage device is correctly mechanically coupled to the device. As soon as the microcontroller receives the signal from the touch sensor that there is a correct mechanical coupling between the electronic storage device and the device, the microcontroller downloads the exactly one piece of data content stored in the electronic storage device into the storage unit of the device.

The touch sensor can also display an optical signal, for example, or trigger an acoustic signal, which signals whether the electronic storage device is correctly mechanically coupled to the device. For example, an LED electrically coupled to the touch sensor can display a green light when there is correct mechanical coupling between the electronic storage device and device and a red light when there is no correct mechanical coupling between the electronic storage device and device. This allows the user to be shown at an early stage that the exactly one piece of data content intended for the device is not being transferred from the electronic storage device to the device due to a lack of correct mechanical coupling between the electronic storage device and the device.

In an embodiment of the invention, the first mechanical coding means has a first defined mechanical configuration and the second mechanical coding means has a second defined mechanical configuration which is complementary to the first defined mechanical configuration. The first and second defined mechanical configurations can be designed geometrically as desired. For example, it can be a corrugation or a plurality of corrugations or a pronounced grid or pattern on at least part of a surface of the electronic device or the device facing the device or the electronic storage device, respectively, when the electronic storage device is electrically and mechanically coupled to the device. The first and second defined mechanical configurations can also be present in the form of one or more elements such as pins, cuboids, prisms, etc. protruding from said surface of the electronic storage device or the device, or correspondingly complementary recesses or a combination of protruding elements and recesses.

According to an advantageous further development of the present invention, the electronic storage device can store a data content identifier which indicates whether the exactly one piece of data content stored in the electronic storage device is an operating software update or an address for the safety-oriented device. For this purpose, the microcontroller can be designed, if the electronic storage device is connected via its first connection unit to the second connection unit of the device, to first read out and interpret the data content identifier from the electronic storage device and then, depending on the interpreted data content identifier, to download the operating software update or the address to the storage unit and preferably to start there.

The address is used for communication between the safety-oriented device and, for example, other input/output modules in a network infrastructure, and is downloaded once by the microcontroller into the storage unit of the device.

The present invention also relates to a method for transmitting exactly one piece of data content from an electronic storage device to a safety-oriented device within the system according to the invention, as described above. First, the device is disconnected from a voltage supply within the scope of the method according to the invention. In the de-energized or currentless state of the device, the first connection unit of the electronic storage device is electrically and mechanically coupled to the second connection unit of the device, an electrical coupling taking place only when the first coding means is correctly mechanically coupled to the second coding means. After the device has been connected to the voltage supply, the microcontroller of the device recognizes, preferably when the device is booting, whether the electronic storage device is connected to the second connection unit of the device. If this is the case, the microcontroller downloads the exactly one piece of data content stored in the electronic storage device from the electronic storage device to the storage unit of the device. The electronic storage device is then electrically and mechanically decoupled from the device.

In the method described above, the microcontroller can preferably also recognize whether the electronic storage device has been connected to the device for the first time. If this is the case, the microcontroller interprets the exactly one piece of data content of the electronic storage device as an address. If this is not the case, however, the microcontroller interprets the exactly one piece of data content of the electronic storage device as an operating software update.

For this purpose, the electronic storage device can store a data content identifier which indicates whether the exactly one piece of data content stored in the electronic storage device is an operating software update or an address for the safety-oriented device, the data content identifier being read out and interpreted from the electronic storage device before the exactly one piece of data content stored in the electronic storage device is downloaded from the electronic storage device to the storage unit of the device, and subsequently, in particular with control of the microcontroller, depending on the interpreted data content identifier, the operating software update or the address being downloaded to the storage unit and preferably also started there.

BRIEF DESCRIPTION OF THE DRAWINGS

The invention is explained in more detail below with reference to several embodiments in conjunction with the accompanying drawings, in which.

DETAILED DESCRIPTION

Figure 1:
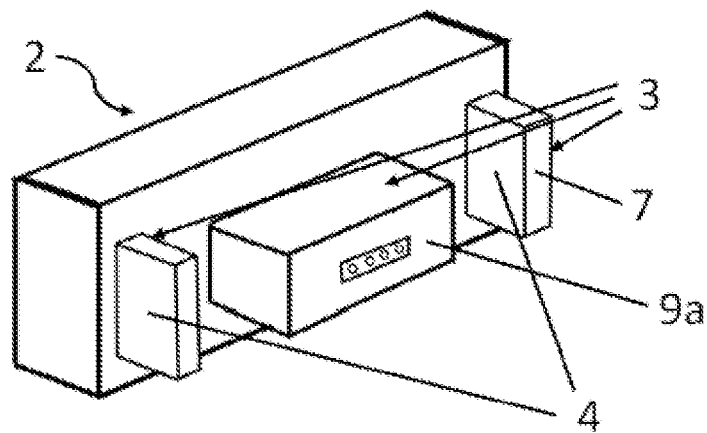
FIG. 1 shows an exemplary system consisting of an electronic storage device and a safety-oriented device according to a first embodiment.
Figure 1:
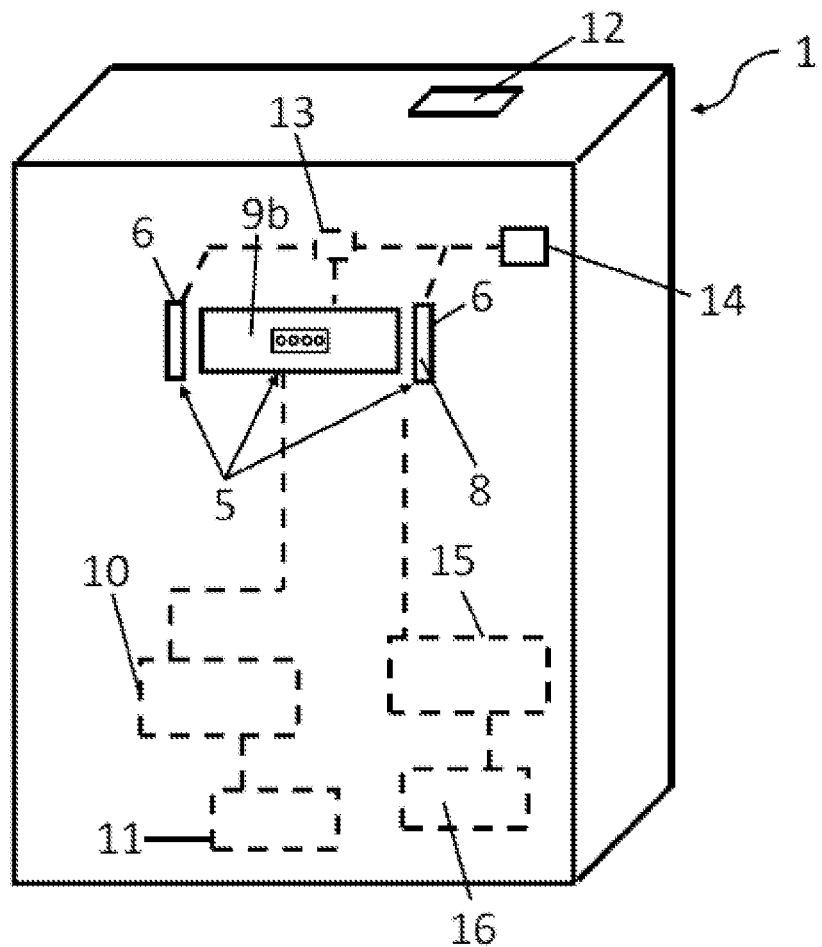

FIG. 1 shows, in sketch form and not true to scale, a first embodiment of a system comprising a safety-oriented device 1, specifically in the present case, for example, a safety-oriented input/output module (bottom in FIG. 1) and an electronic storage device 2 separated therefrom (top in FIG. 1). According to an exemplary embodiment, a first, preferably exactly one, piece of data content is stored in the electronic storage device 2, which piece of data content is intended for the safety-oriented input/output module 1 (not shown in FIG. 1), the exactly one piece of data content being either an operating software update or an address for the input/output module 1.

The electronic storage device 2 in FIG. 1 has a first connection unit 3 for mechanical and electrical coupling to the input/output module 1 and the input/output module 1 shown in FIG. 1 has a second connection unit 5 for mechanical and electrical coupling to the electronic storage device 2 at the first connection unit 3 thereof. For electrical coupling, the first connection unit 3 of the electronic storage device 2 and the second connection unit 5 of the input/output module in the embodiment shown in FIG. 1 are each equipped with an electrical interface 9a, 9b, so that the electronic storage device 2 can be electrically coupled via its electrical interface 9a to the electrical interface 9b of the input/output module 1. For mechanical coupling, on the other hand, the first connection unit 3 of the electronic storage device 2 comprises a first mechanical coding means 4 and the second connection unit 5 of the input/output module 1 comprises a second mechanical coding means 6, which is complementary to the first mechanical coding means 4.

The first mechanical coding means 4 of the electronic storage device 2 preferably has a first defined mechanical configuration 7. In FIG. 1, the first defined mechanical configuration 7 of the first mechanical coding means 4 consists of two elements, namely two cuboids, which protrude from the surface of the electronic storage device 2 facing the input/output module 1 when the electronic storage device 2 is electrically and mechanically coupled to the input/output module 1. However, a wide variety of other geometric shapes are also conceivable, and the number of protruding elements can also be arbitrary, starting with one protruding element. Instead of protruding elements, recesses that are complementary thereto or a combination of protruding elements and recesses can also be formed on the electronic storage device 2 as a first defined mechanical configuration 7. The second mechanical coding means 6 of the input/output module 1 preferably has a second defined mechanical configuration 8 which is complementary to the first defined mechanical configuration 7 of the first mechanical coding means 4. In the example shown in FIG. 1, the second defined mechanical configuration 8 of the second mechanical coding means 6 consists of two cuboid recesses 7. These cuboid-shaped recesses 7 are formed on the surface of the input/output module 1 facing the electronic storage device 2 when the electronic storage device 2 is electrically and mechanically coupled to the input/output module 1 in such a way that they substantially completely receive the two protruding cuboids 7 of the first mechanical coding means 4 of the electronic storage device 2.

The safety-oriented input/output module 1 shown in FIG. 1 also has an interface 12 for connecting, for example, a field device (not shown), for example an actuator or sensor. In this case, the sensor is in particular designed to generate a safety-related input signal, while the actuator is in particular designed to generate a safety-related output signal. The safety-related input signal can, for example, signal that an emergency stop button has been actuated, while the safety-related output signal generated by the actuator can switch off a motor, for example. In addition, the input/output module 1 comprises a microcontroller 10, which controls and monitors the input/output module 1, and a storage unit 11, in which an operating system is stored and which is electrically coupled to the microcontroller 10. In the embodiment shown in FIG. 1, the input/output module 1 advantageously also has a sensor 13 which is electrically coupled to the second mechanical coding means 6 and preferably to the microcontroller 10 and is advantageously designed as a touch sensor 13. The touch sensor 13 is designed in particular to send an electrical signal to the microcontroller 10 in the electrically and mechanically coupled state (not shown) of the electronic storage device 2 to the input/output module 1, which electrical signal signals that the electronic storage device 2 is correctly mechanically coupled to the input/output module 1. Correct mechanical coupling means that the first mechanical coding means 4 is mechanically coupled to the second mechanical coding means 6 in the intended and envisaged manner and in particular that there is no forcible insertion of the first mechanical coding means 4 into the second mechanical coding means 6 contrary to the intended use, for example with at least one of the protruding cuboids being broken off. The microcontroller 10, the storage unit 11 and the touch sensor 13 are each shown in dashed lines in FIG. 1, since they are located inside the input/output module 1 in FIG. 1 and are not visible from the external view of the input/output module 1.

According to an advantageous development, the safety-oriented device 1 can also be designed having multiple channels, for example two channels. In this case, the input/output module 1 comprises at least one further microcontroller 15, which controls and monitors the input/output module 1, and a further storage unit 16, in which an operating system is stored and which is electrically coupled to the microcontroller 15. It should be noted that the microcontroller 10 and the microcontroller 15 can differ. For example, they come from different manufacturers. The touch sensor 13 is designed in particular to also send an electrical signal to the microcontroller 15 in the electrically and mechanically coupled state (not shown) of the electronic storage device 2 to the input/output module 1, which electrical signal signals that the electronic storage device 2 is correctly mechanically coupled to the input/output module 1. The microcontroller 15 and the storage unit 16 are each shown in dashed lines in FIG. 1, since they are located inside the input/output module 1 in FIG. 1 and are not visible from the external view of the input/output module 1. According to this exemplary embodiment, a second piece of data content is stored in the electronic storage device 2, which piece of data content is intended for the two-channel safety-oriented input/output module 1 (not shown in FIG. 1), the second piece of data content being either an operating software update or an address for the input/output module 1, which address can be identical to the address represented by the first piece of data content. It should be noted that the two storage units 11 and 16 each form a physical storage or can be implemented by a common storage in which they each form a storage region.

The mode of operation of the system consisting of the safety-oriented input/output module 1 and the electronic storage device 2 according to the first exemplary embodiment is explained in more detail below. Exactly one piece of data content for the safety-oriented input/output module 2 is stored in the electronic storage device 2 and is transferred from the electronic storage device 2 to the storage unit 11 of the input/output module 2 as follows. First, the input/output module 2 is disconnected from a voltage supply (not shown in the drawings). The electronic storage device 2 is then electrically and mechanically coupled via its first connection unit 3 to the second connection unit 5 of the input/output module 1. An electrical coupling, which, in the embodiment of FIG. 1, comes about by coupling the electrical interface 9a of the electronic storage device 2 to the electrical interface 9b of the input/output module 1, but is not shown in detail, only takes place with correct mechanical coupling of the first mechanical coding means 4 to the second mechanical coding means 6 which is complementary thereto. If the input/output module 1 preferably comprises a sensor 13, in particular a touch sensor 13, this recognizes whether there is a correct mechanical coupling. If this is the case, the touch sensor 13 sends a corresponding signal in this regard to the microcontroller 10 and advantageously also to an LED display 14 attached to the input/output module 1, which display then shows a green light. However, if there is no correct mechanical coupling, the touch sensor 13 likewise signals this to the microcontroller 10 and the LED display 14. The LED display 14 then shows a red light and the microcontroller 10 does not take any further steps with regard to the electronic storage device 2. In the event of an incorrect mechanical coupling reported by the touch sensor 13, the microcontroller 10 in particular does not download the exactly one piece of data content stored in the electronic storage device 2 to the storage unit 11 of the input/output module 1.

After a successful mechanical and electrical coupling, the input/output module 1 is connected to the power supply. The microcontroller 10 of the input/output module 1 preferably already recognizes during the upload whether the electronic storage device 2 is connected via its first connection unit 3 to the second connection unit 5 of the input/output module 1. If this is the case, the microcontroller 10 downloads the exactly one piece of data content stored in the electronic storage device 2 from the electronic storage device 2 to the storage unit 11 of the input/output module 1. In addition, the microcontroller 10 preferably also recognizes whether the electronic storage device 2 has been connected to the input/output module 1 for the first time. If this is the case, the microcontroller 10 interprets the exactly one piece of data content of the electronic storage device 2 as an address which is used for communication between the input/output module 1 and, for example, other input/output modules in a network infrastructure, and downloads this address to the storage unit 11 of the input/output module 1. However, if the electronic storage device 2 has not been connected to the input/output module 1 for the first time, the microcontroller 10 interprets the exactly one piece of data content of the electronic storage device 2 as an operating software update and downloads this operating software update to the storage unit 11 of the input/output module 1 and in particular starts the operating software update in order to update the operating system stored in the storage unit 11. Finally, the electronic storage device 2 is decoupled both electrically and mechanically from the input/output module 1 and is thus removed from the input/output module 1.

According to an advantageous embodiment, for this purpose a data content identifier can be stored in the electronic storage device 2, 2', 2", 2'", which identifier indicates whether the exactly one piece of data content stored in the electronic storage device 2, 2', 2", 2'" is an operating software update or an address for the safety-oriented device 1, 1', 1", 1'". In this context, the microcontroller 10 can be designed, if the electronic storage device 2, 2', 2", 2'" is connected via its first connection unit 3, 3', 3", 3'" to the second connection unit 5, 5', 5", 5'" of the safety-oriented device 1, 1', 1", 1'", to first read out and interpret the data content identifier from the electronic storage device 2, 2', 2", 2'" and then, depending on the interpreted data content identifier, to download the operating software update or the address to the storage unit 11 and then optionally to start said update or address. The location at which the data content identifier is stored in the electronic storage device is known to the microcontroller 10. In practice, it is expedient that when the safety-oriented device is used for the first time, an electronic storage device is connected in which an address, in particular a safety address, is stored as data content for the safety-oriented device. Subsequently, i.e. during operation, an operating software update can generally be downloaded to the safety-oriented device by means of the electronic storage device and started there.

In order to be able to download an operating software update efficiently and in an energy-saving manner, the electronic storage device 2, 2', 2", 2'" can also store an operating software update identifier if the exactly one piece of data content is an operating software update. The operating software update identifier can be, for example, a checksum that was formed over the operating software update and stored together therewith in the electronic storage device 2. The microcontroller 10 can be designed i) after reading out and interpreting the data content identifier, to read out the operating software update identifier from the electronic storage device,
ii) in response to the read-out operating software update identifier, to check whether the associated operating software update is stored in the storage unit, and, only if the associated operating software update is not stored in the storage unit 11, to download the exactly one piece of data content to the storage unit. For this purpose, an identifier, for example the checksum of the operating software update stored in the electronic storage device, can also be stored in the microcontroller 10, which identifier the microcontroller 10 then compares with the read-out operating software update identifier. In the event that no operating software update at all has yet been downloaded into the storage unit 11, no update identifier has yet been stored in the safety-oriented device either. If the microcontroller 10 does not find a match between the read-out operating software update identifier and the identifier stored in the storage unit 11, it causes the operating software update to be downloaded from the electronic storage device and stored in the storage unit 11 together with the operating software update identifier. The microcontroller 10 also recognizes a mismatch, for example, from the fact that no operating software update at all has been downloaded in the safety-oriented device. It should also be noted that the microcontroller 10 can use the operating software update identifier as the start address at which the exactly one piece of data content can be found in the electronic storage device. If a file directory structure is used on the electronic storage device, a file name can also be used as the operating software update identifier, under which file name the microcontroller 10 can find the exactly one piece of data content.

The mode of operation of the system consisting of the safety-oriented input/output module 1 and the electronic storage device 2 according to the advantageous development is explained in more detail below, according to which the safety-oriented device 1 has two channels.

A first piece of data content and a second piece of data content for the safety-oriented input/output module 2 are stored in the electronic storage device 2, each of which can be an operating system update or an address. The first and second pieces of data content are transferred from the electronic storage device 2 to the storage unit 11 and the storage unit 16, respectively, of the input/output module 1. First, the input/output module 1 is disconnected from a voltage supply (not shown in the drawings). The electronic storage device 2 is then electrically and mechanically coupled via its first connection unit 3 to the second connection unit 5 of the input/output module 1. An electrical coupling, which, in the embodiment of FIG. 1, comes about by coupling the electrical interface 9a of the electronic storage device 2 to the electrical interface 9b of the input/output module 1, but is not shown in detail, only takes place with correct mechanical coupling of the first mechanical coding means 4 to the second mechanical coding means 6 which is complementary thereto. If the input/output module 1 preferably comprises a sensor, in particular a touch sensor 13, this recognizes whether there is a correct mechanical coupling. If this is the case, the touch sensor 13 sends a corresponding signal in this regard to the microcontroller 10 and the microcontroller 15 and advantageously also to an LED display 14 attached to the input/output module 1, which display then shows a green light. However, if there is no correct mechanical coupling, the touch sensor 13 likewise signals this to the microcontroller 10 and the microcontroller 15 and the LED display 14. The LED display 14 then shows a red light and the microcontroller 10 does not take any further steps with regard to the electronic storage device 2. In the event of an incorrect mechanical coupling reported by the touch sensor 13, the microcontroller 10 in particular does not download the first piece of data content stored in the electronic storage device 2 to the storage unit 11 of the input/output module 1 and the microcontroller 15 therefore in particular does not download the second piece of data content stored in the electronic storage device 2 to the storage unit 16 of the input/output module 1.

After a successful mechanical and electrical coupling, the input/output module 1 is connected to the power supply. The microcontrollers 10 and 15 of the input/output module 1 preferably already recognize during the upload whether the electronic storage device 2 is connected via its first connection unit 3 to the second connection unit 5 of the input/output module 1. If this is the case, the microcontroller 10 downloads the first piece of data content stored in the electronic storage device 2 from the electronic storage device 2 to the storage unit 11 of the input/output module 1 and the microcontroller 15 downloads the second piece of data content stored in the electronic storage device 2 from the electronic storage device 2 to the storage unit 16 of the input/output module 1.

Since the electronic storage device 2, operating software update storage device or address storage device can be used, a data content identifier can be stored in the electronic storage device 2 which indicates whether the first and second pieces of data content stored in the electronic storage device 2 are each an operating software update or an address for the safety-oriented device 1. The first microcontroller 10 can be designed, if the electronic storage device 2 is connected via its first connection unit 3, 3', 3", 3''' to the second connection unit 5 of the input/output module 1, to first read out and interpret the data content identifier from the electronic storage device 2 and then, depending on the interpreted data content identifier, to download the operating software update or the address to the first storage unit 11, and the second microcontroller 15 can be designed, if the electronic storage device 2 is connected via its first connection unit 3 to the second connection unit 5 of the input/output module 1, to first read out and interpret the data content identifier from the electronic storage device 2 and then, depending on the interpreted data content identifier, to download the operating software update or the address to the second storage unit 16.

In order to be able to carry out an operating software update efficiently and in an energy-saving manner, if the first piece of data content and the second piece of data content are each an operating software update, a first operating software update identifier assigned to the first piece of data content and a second piece of data content assigned to the second operating software update can also be stored in the electronic storage device 2. The first and second operating software update identifiers can, for example, each be a checksum that is formed over the first and second operating software updates, respectively. The first and second operating software update identifiers are stored together with the first and second pieces of data content in the electronic storage device 2, there being a logical or physical association between the first operating software update identifier and the first piece of data content and between the second operating software update identifier and the second piece of data content. In this case, the first microcontroller 10 can be designed i) after reading out and interpreting the data content identifier, to read out the first operating software update identifier from the electronic storage device,
  ii) in response to the read-out first operating software update identifier, to check whether the associated first operating software update is stored in the storage unit 11, and, only if the associated first operating software update is not stored in the storage unit 11, to download the first piece of data content to the first storage unit 11.

In a similar way, the second microcontroller 15 is designed i) after reading out and interpreting the data content identifier, to read out the second operating software update identifier from the electronic storage device,
  ii) in response to the read-out second operating software update identifier, to check whether the associated second operating software update is stored in the storage unit 16, and, only if the associated second operating software update is not stored in the storage unit 16, to download the second piece of data content to the second storage unit 16. It should also be noted that the microcontroller 10 can use the first operating software update identifier as the start address at which the first piece of data content can be found in the electronic storage device. If a file directory structure is used on the electronic storage device 2, a file name can also be used as the first operating software update identifier, under which file name the microcontroller 10 can find the first piece of data content. In a similar way, depending on the implementation, the microcontroller 15 can use the second operating software update identifier as the start address at which the second piece of data content can be found in the electronic storage device. If a file directory structure is used on the electronic storage device 2, a file name can also be used as the second operating software update identifier, under which file name the microcontroller 15 can find the second piece of data content.

Figure 2:
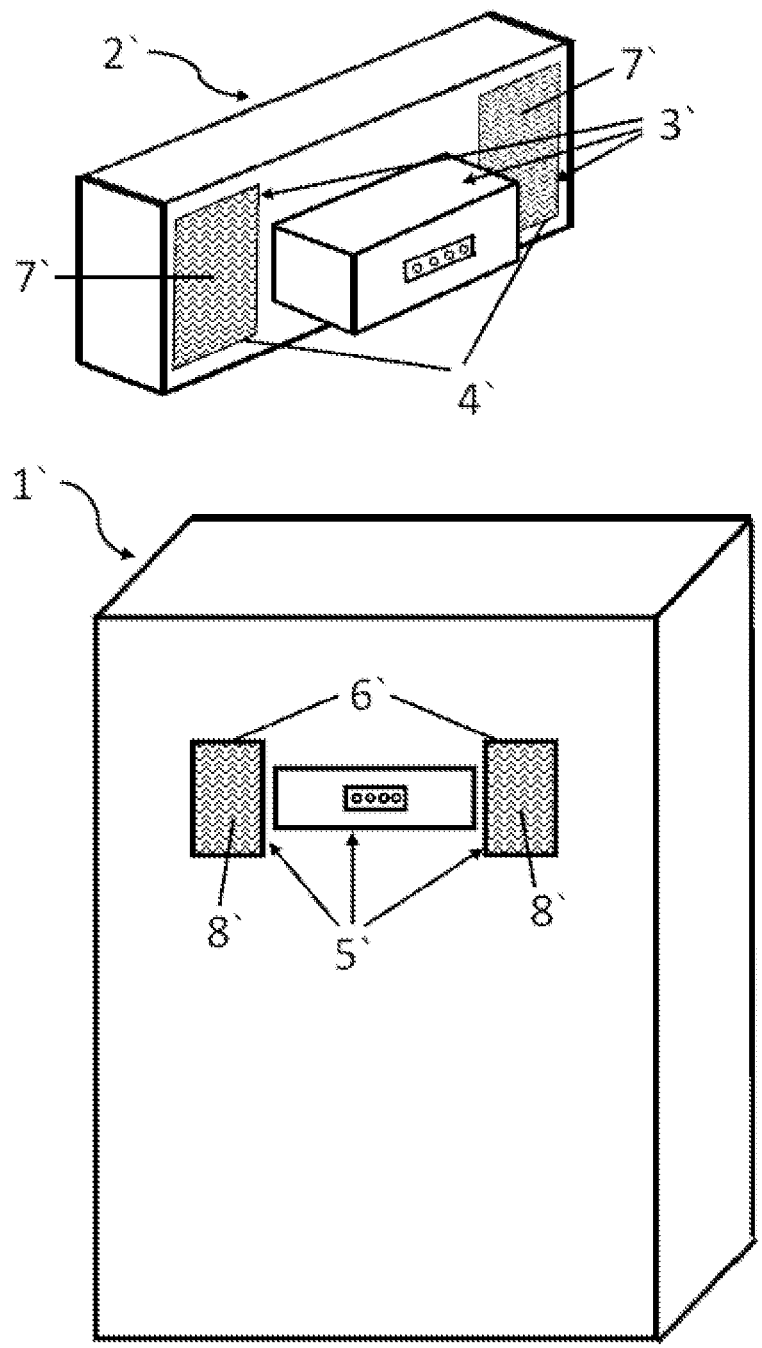
FIG. 2 shows an exemplary system consisting of an electronic storage device and a safety-oriented device according to a second embodiment.
Figure 3:
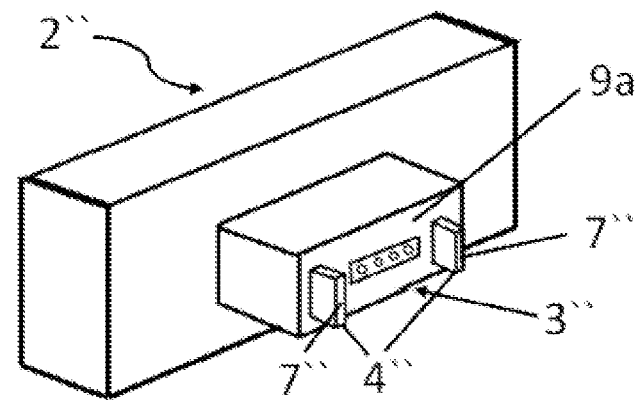
FIG. 3 shows an exemplary system consisting of an electronic storage device and a safety-oriented device according to a third embodiment.
Figure 3:
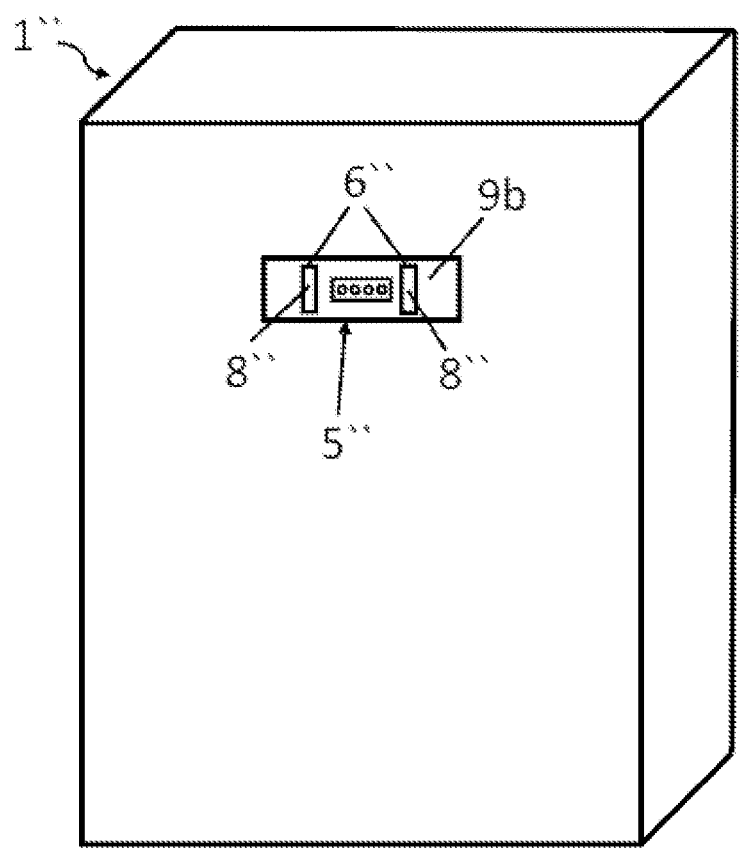
Figure 4:
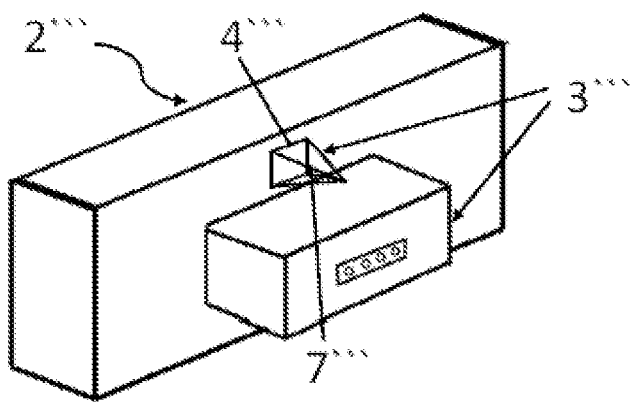
FIG. 4 shows an exemplary system consisting of an electronic storage device and a safety-oriented device according to a fourth embodiment.
Figure 4:
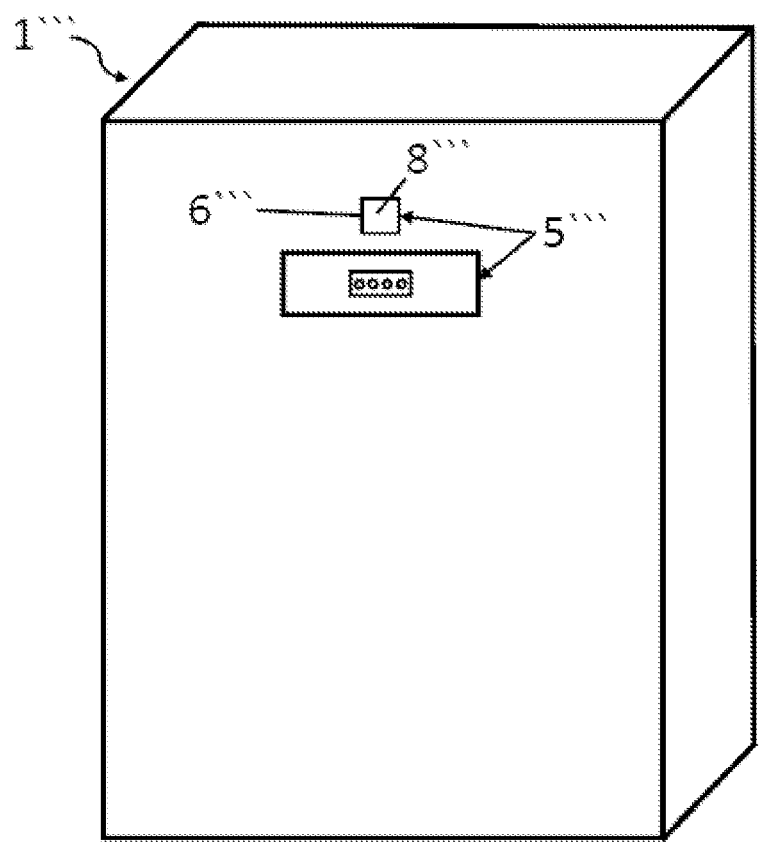

FIGS. 2, 3 and 4 differ from FIG. 1 substantially only in that the first mechanical coding means 4', 4", 4''' of the first connection unit 3', 3", 3''' of the electronic storage device 2', 2", 2''' shown in each case and the second mechanical coding means 6', 6", 6''' of the second connection unit 5', 5", 5''' of the safety-oriented input/output module 1', 1", 1''' shown in each case have a first defined mechanical configuration 7', 7", 7''' and a second defined mechanical configuration 8', 8", 8''' that are different from those shown in FIGS. 1*a* and 1*b*.

In FIG. 2, the first mechanical coding means 4' of the first connection unit 3' of the electronic storage device 2' (top in FIG. 2) preferably has a first defined mechanical configuration 7' which consists of two specially structured regions, in particular provided with corrugations, on the surface of the electronic storage device 2'. The number and arrangement of the specially structured regions can vary. The entire surface of the surface of the storage device 2' facing the input/output module 1 when the electronic storage device 2' is electrically and mechanically coupled to the input/output module 1' can also be provided, for example, with a special structure, for example a corrugation, a wave structure, a comb-like structure, etc. Different types of structure can also be present as the first defined mechanical configuration 7'. The second mechanical coding means 6' of the second connection unit 5' of the input/output module 1' (bottom in FIG. 2) accordingly has a second defined mechanical configuration 8' which is complementary to the first defined mechanical configuration 7'.

In FIG. 3, the first mechanical coding means 4" of the first connection unit 3" of the electronic storage device 2" (top in FIG. 3) preferably has a first defined mechanical configuration 7" which consists of two protruding elements, namely two cuboids, which are arranged, however, on the electrical interface 9*a*. As an alternative to the cuboids, a wide variety of other geometric shapes are conceivable. The number of protruding elements can also be arbitrary, starting with one protruding element. Instead of protruding elements, recesses that are complementary thereto or a combination of protruding elements and recesses can also be formed in the electronic storage device 2" as a first defined mechanical configuration 7". The second mechanical coding means 6" of the second connection unit 5" of the input/output module 1" (bottom in FIG. 3) accordingly has a second defined mechanical configuration 8" which is complementary to the first defined mechanical configuration 7", namely, in FIG. 3b, in the form of two cuboid recesses at the electrical interface 9b.

In FIG. 4, the first mechanical coding means 4''' of the first connection unit 3''' of the electronic storage device 2''' (top in FIG. 4) preferably has a first defined mechanical configuration 7''' which consists of a protruding element in the form of a prism. The second mechanical coding means 6''' of the second connection unit 5''' of the input/output module 1''' (bottom in FIG. 4) accordingly has a second defined mechanical configuration 8''' which is complementary to the first defined mechanical configuration 7''', namely in the form of a prismatic recess.

Even if not explicitly shown in FIGS. 2, 3 and 4, the safety-oriented input/output module 1', 1", 1''' shown therein in each case also has at least one microcontroller 10, a storage unit 11 and an interface 12 for connecting a safety-oriented device, for example a sensor or actuator. The safety-oriented input/output module 1', 1", 1''' in FIGS. 2, 3 and 4, respectively, can preferably also be coupled to the second mechanical coding means 6', 6", 6''' and preferably also have a sensor 13 electrically coupled to the microcontroller 10, which sensor in turn is advantageously coupled to an LED display 14 of the input/output module 1', 1", 1''' and is designed as a touch sensor 13.

Instead of a safety-oriented input/output module 1, 1', 1", 1''' shown by way of example in FIG. 1-4, a safety-oriented control device or, for example, a laser scanner, frequency converter or a light grid can in particular be used as a safety-oriented device.

Some of the exemplary aspects are summarized again below.

A system is provided which comprises a safety-oriented device 1, 1', 1", 1''' having at least one first microcontroller 10 and a second microcontroller 15 and an electronic storage device 2, 2', 2", 2''' which is separate from the safety-oriented device and in which a first piece of data content and a second piece of data content for the safety-oriented device 1, 1', 1", 1''' are stored. The first and second pieces of data content can each be either an operating software update or an address. The electronic storage device 2, 2', 2", 2''' can comprise a first connection unit 3, 3', 3", 3''' for mechanical and electrical coupling to the device 1, 1', 1", 1''', the first connection unit 3, 3', 3", 3''' comprising a first mechanical coding means 4, 4', 4", 4'''. The safety-oriented device 1, 1', 1", 1''' comprises a first storage unit 11, which is assigned to the first microcontroller 10 and in which a first operating system is stored, a second storage unit 16, which is assigned to the second microcontroller 15 and in which a second operating system is stored, and a second connection unit 5, 5', 5", 5''' for mechanical and electrical coupling to the electronic storage device 2, 2', 2", 2''', the second connection unit 5, 5', 5", 5''' having a second mechanical coding means 6, 6', 6", 6''', the first 4, 4', 4", 4''' mechanical coding means and the second mechanical coding means 6, 6', 6", 6''' being complementary to one another. The first microcontroller 10 of the safety-oriented device 1, 1', 1", 1''' can be designed to recognize whether the electronic storage device 2, 2', 2", 2''' is connected via its first connection unit 3, 3', 3", 3''' to the second connection unit 5, 5', 5", 5''' of the safety-oriented device 1, 1', 1", 1'''. In this case, the first microcontroller 10 can also be designed to download the first piece of data content stored in the electronic storage device 2, 2', 2", 2''' from the electronic storage device 2, 2', 2", 2''' to the first storage unit 11 of the device 1, 1', 1", 1''', and the second microcontroller 15 of the safety-oriented device 1, 1', 1", 1''' can be designed to recognize whether the electronic storage device 2, 2', 2", 2''' is connected via its first connection unit 3, 3', 3", 3''' to the second connection unit 5, 5', 5", 5''' of the device 1, 1', 1", 1'''. In this case, the second microcontroller 15 can also be designed to download the second piece of data content stored in the electronic storage device 2, 2', 2", 2''' from the electronic storage device 2, 2', 2", 2''' to the second storage unit 16 of the device 1, 1', 1", 1'''.

The safety-oriented device 1, 1', 1", 1''' is preferably designed having multiple channels.

The electronic storage device 2, 2', 2", 2''' can preferably store a data content identifier which indicates whether the first and second pieces of data content stored in the electronic storage device 2, 2', 2", 2''' are each an operating software update or an address for the safety-oriented device 1, 1', 1", 1'''. The first microcontroller 10 can be designed, if the electronic storage device 2, 2', 2", 2''' is connected via its first connection unit 3, 3', 3", 3''' to the second connection unit 5, 5', 5", 5''' of the safety-oriented device 1, 1', 1", 1''', to first read out and interpret the data content identifier from the electronic storage device 2, 2', 2", 2''' and then, depending on the interpreted data content identifier, to download the operating software update or the address to the first storage unit 11. In a similar way, the second microcontroller 15 can be designed, if the electronic storage device 2, 2', 2", 2''' is connected via its first connection unit 3, 3', 3", 3''' to the second connection unit 5, 5', 5", 5''' of the device 1, 1', 1", 1''', to first read out and interpret the data content identifier from the electronic storage device 2, 2', 2", 2''' and then, depending on the interpreted data content identifier, to download the operating software update or the address to the second storage unit 16.

If the first piece of data content and the second piece of data content are each an operating software update, the electronic storage device 2, 2', 2", 2''' stores a first operating software update identifier assigned to the first piece of data content and a second operating software update identifier assigned to the second piece of data content. The first microcontroller 10 can then be designed i) after reading out and interpreting the data content identifier, to read out the first operating software update identifier from the electronic storage device, ii) in response to the read-out first operating software update identifier, to check whether the associated first operating software update is stored in the storage unit 11, and, only if the associated first operating software update is not stored in the storage unit 11, to download the first piece of data content to the first storage unit 11. The second microcontroller 15 can be designed i) after reading out and interpreting the data content identifier, to read out the second operating software update identifier from the electronic storage device, ii) in response to the read-out second operating software update identifier, to check whether the associated second operating software update is stored in the storage unit 16, and, only if the associated second operating software update is not stored in the storage unit 16, to download the second piece of data content to the second storage unit 16.

LIST OF REFERENCE SIGNS

1, 1', 1", 1''': Safety-oriented input/output module as an example of a safety-oriented device 2, 2', 2": Electronic storage device
3, 3', 3", 3'": First connection unit
4, 4', 4", 4'": First mechanical coding means
5, 5', 5", 5'": Second connection unit
6, 6', 6", 6'": Second mechanical coding means
7, 7', 7", 7'": First defined mechanical configuration
8, 8', 8", 8'": Second defined mechanical configuration
9a, 9b: Electrical interface of the storage medium, input/output module
10: Microcontroller
11: Storage unit
12: Interface to a field device
13: Sensor
14: LED display
15: Microcontroller
16: Storage unit

The invention claimed is:

1. A system comprising a safety-oriented device and an electronic storage device which is separate therefrom and in which exactly one piece of data content for the safety-oriented device is stored, wherein the exactly one piece of data content is either an operating software update or an address, wherein the electronic storage device comprises a first connection unit for mechanical and electrical coupling to the device, wherein the first connection unit comprises a first mechanical coding means, and wherein the device comprises a storage unit in which an operating system is stored, a microcontroller and a second connection unit for mechanical and electrical coupling to the electronic storage device, wherein the second connection unit has a second mechanical coding means, wherein the first mechanical coding means and the second mechanical coding means are complementary to one another, wherein the microcontroller of the device is designed to recognize whether the electronic storage device is connected via its first connection unit to the second connection unit of the device, and in this case is also designed to download the exactly one piece of data content stored in the electronic storage device from the electronic storage device to the storage unit of the device.

2. The system according to claim 1, wherein:
the electronic storage device stores a data content identifier which indicates whether the exactly one piece of data content stored in the electronic storage device is an operating software update or an address for the safety-oriented device, and
the microcontroller is designed, if the electronic storage device is connected via its first connection unit to the second connection unit of the device, to first read out and interpret the data content identifier from the electronic storage device and then, depending on the interpreted data content identifier, to download the operating software update or the address to the storage unit of the safety-oriented device.

3. The system according to claim 2, wherein:
if the exactly one piece of data content is an operating software update, the electronic storage device stores an operating software update identifier, and the microcontroller is designed:
i) after reading out and interpreting the data content identifier, to read out the operating software update identifier from the electronic storage device,
ii) in response to the read-out operating software update identifier, to check whether the associated operating software update is stored in the storage unit, and, only if the associated operating software update is not stored in the storage unit, to download the exactly one piece of data content to the storage unit.

4. A system comprising:
a safety-oriented device having at least one first microcontroller and a second microcontroller and an electronic storage device which is separate from the safety-oriented device and in which a first piece of data content and a second piece of data content for the safety-oriented device are stored, the first and second pieces of data content each being either an operating software update or an address,
wherein the electronic storage device comprises a first connection unit for mechanical and electrical coupling to the device, wherein the first connection unit comprises a first mechanical coding means, and
wherein the device comprises a first storage unit, which is assigned to the first microcontroller and in which a first operating system is stored, a second storage unit, which is assigned to the second microcontroller and in which a second operating system is stored, and a second connection unit for mechanical and electrical coupling to the electronic storage device, wherein the second connection unit has a second mechanical coding means, wherein the first mechanical coding means and the second mechanical coding means are complementary to one another,
wherein the first microcontroller of the device is designed to recognize whether the electronic storage device is connected via its first connection unit to the second connection unit of the device, and in this case is also designed to download the first piece of data content stored in the electronic storage device from the electronic storage device to the first storage unit of the device, and wherein the second microcontroller of the device is designed to recognize whether the electronic storage device is connected via its first connection unit to the second connection unit of the device, and in this case is also designed to download the second piece of data content stored in the electronic storage device from the electronic storage device to the second storage unit of the device.

5. The system according to claim 4, wherein:
the electronic storage device stores a data content identifier which indicates whether the first and second pieces of data content stored in the electronic storage device are each an operating software update or an address for the safety-oriented device, and
the first microcontroller is designed, if the electronic storage device is connected via its first connection unit to the second connection unit of the device, to first read out and interpret the data content identifier from the electronic storage device and then, depending on the interpreted data content identifier, to download the operating software update or the address to the first storage unit, and in that the second microcontroller is designed, if the electronic storage device is connected via its first connection unit to the second connection unit of the device, to first read out and interpret the data content identifier from the electronic storage device and then, depending on the interpreted data content identifier, to download the operating software update or the address to the second storage unit.

6. The system according to claim 5, wherein:
if the first piece of data content and the second piece of data content are each an operating software update, the electronic storage device stores a first operating software update identifier assigned to the first piece of data content and a second operating software update identifier assigned to the second piece of data content, and in that the first microcontroller is designed i) after reading out and interpreting the data content identifier, to read out the first operating software update identifier from the electronic storage device, ii) in response to the read-out first operating software update identifier, to check whether the associated first operating software update is stored in the storage unit, and, only if the associated first operating software update is not stored in the storage unit, to download the first piece of data content to the first storage unit, and in that the second microcontroller is designed i) after reading out and interpreting the data content identifier, to read out the second operating software update identifier from the electronic storage device, ii) in response to the read-out second operating software update identifier, to check whether the associated second operating software update is stored in the storage unit, and, only if the associated second operating software update is not stored in the storage unit, to download the second piece of data content to the second storage unit.

7. The system according to claim 4, wherein the safety-oriented device comprises a sensor which is designed to recognize whether the electronic storage device is correctly mechanically coupled to the device.

8. The system according to claim 7, wherein the sensor is a touch sensor and is designed to send an electrical signal to the microcontroller which signals that the electronic storage device is correctly mechanically coupled to the device.

9. The system according to claim 4, wherein:

the sensor is a touch sensor and is designed to send an electrical signal to the microcontroller which signals that the electronic storage device is correctly mechanically coupled to the device, and the touch sensor is designed to send an electrical signal to the second microcontroller which signals that the electronic storage device is correctly mechanically coupled to the device.

10. The system according to claim 4, wherein the first mechanical coding means has a first defined mechanical configuration and the second mechanical coding means has a second defined mechanical configuration which is complementary to the first defined mechanical configuration.

11. A method for transferring exactly one piece of data content from an electronic storage device to a safety-oriented device within a system according to claim 1, comprising the steps of:

disconnecting the device from a power supply, electrical and mechanical coupling of the first connection unit of the electronic storage device to the second connection unit of the device, wherein an electrical coupling takes place only with correct mechanical coupling of the first mechanical coding means to the second mechanical coding means, connecting the device to the power supply, detecting, by means of the microcontroller of the device, whether the electronic storage device is connected to the second connection unit of the device, and in this case:

downloading exactly one piece of data content stored in the electronic storage device from the electronic storage device to the storage unit of the device, electrically and mechanically decoupling the electronic storage device from the device.

12. The method according to claim 11, wherein the electronic storage device stores a data content identifier which indicates whether the exactly one piece of data content stored in the electronic storage device is an operating software update or an address for the safety-oriented device, wherein, before downloading the exactly one piece of data content from the electronic storage device to the storage unit of the device, the data content identifier is read out and interpreted by the microcontroller from the electronic storage device, and wherein, depending on the interpreted data content identifier, the operating software update or the address is subsequently downloaded to the storage unit.

13. The method for transferring data content from an electronic storage device to a safety-oriented device within a system according to claim 4, comprising the steps of:

disconnecting the device from a power supply, electrical and mechanical coupling of the first connection unit of the electronic storage device to the second connection unit of the device, wherein an electrical coupling takes place only with correct mechanical coupling of the first mechanical coding means to the second mechanical coding means, connecting the device to the power supply, detecting, by means of the first microcontroller of the device, whether the electronic storage device is connected to the second connection unit of the device, and in this case:

downloading the first piece of data content stored in the electronic storage device from the electronic storage device to the first storage unit of the device, detecting, by means of the second microcontroller of the device, whether the electronic storage device is connected to the second connection unit of the device, and in this case:

downloading the second piece of data content stored in the electronic storage device from the electronic storage device to the second storage unit of the device, electrically and mechanically decoupling the electronic storage device from the device.

14. The system according to claim 1, wherein the safety-oriented device comprises a sensor which is designed to recognize whether the electronic storage device is correctly mechanically coupled to the device.

15. The system according to claim 1, wherein the first mechanical coding means has a first defined mechanical configuration and the second mechanical coding means has a second defined mechanical configuration which is complementary to the first defined mechanical configuration.

* * * * *